United States Patent Office 3,385,805
Patented May 28, 1968

3,385,805
METHOD FOR THE MANUFACTURE OF SYNTHETIC LEATHER AND PRODUCT THEREOF
Barend Pieters, Huizen, Netherlands, assignor to Balamundi Nederland N.V., Havenstraat, Holland, a corporation of the Netherlands
No Drawing. Filed Apr. 16, 1965, Ser. No. 448,836
13 Claims. (Cl. 260—2.5)

ABSTRACT OF THE DISCLOSURE

The present invention is directed to synthetic leathers having air and water-vapor permeability and to the method of producing such. The synthetic leather is prepared by (1) depositing upon a carrier a composition comprising (a) an aqueous dispersion of a vinyl polymer or copolymer, (b) a plasticizer for said polymer, and (c) from 5 to 40% by weight of a thermosetting resin and (2) gelling said composition preferably at a temperature above 160° C. The preferred thermosetting resins are the alkylated urea-formaldehyde resins and the alkylated melamine-formaldehyde resins.

Background of the invention and discussion of the prior art

This invention pertains to a manufacturing method for synthetic leather in which an aqueous dispersion of a vinyl polymer or copolymer and a plasticizer to which have been added one or more pigments and/or fillers is doctored onto a carrier and are subsequently gelled by heating. The purpose of the invention is to yield a method of this type in which the obtained synthetic leather is permeable to air and water vapor. The vinyl polymer is preferably polyvinyl chloride, and the copolymer is preferably one of vinyl chloride and vinyl acetate. It is to be understood, however, that as is well known to the art, other vinyl polymers and copolymers, such as a copolymer of vinylidene chloride and acrylonitries may be used.

Different manufacturing methods of synthetic leather are known in which a vinyl based paste is doctored onto a carrier, gelled by heating and subsequently grained.

Normally, one uses a paste in which the polymer and/or copolymer of vinyl chloride, together with one or more pigments and/or fillers is dispersed in a plasticizer. However, this method yields a synthetic leather that is not permeable to air and water vapor. Different methods have been proposed to overcome this disadvantage: For example, one can perforate the synthetic leather with very fine needles. This, however, has the disadvantage that the appearance of the leather is less attactive, that the leather also becomes in very many instances not only permeable to air and water vapor, but also to water itself. The danger is that the physical strength of the carrier has ben decreased by the perforation.

Another proposal has been to make a porous synthetic leather by the addition of a water soluble material to the resin base. After gelation and graining this material could be washed out leaving very fine pores in the synthetic layer. This method, however, has been proven to be impractical in practice.

It is also known that a water vapor permeable synthetic leather can be made by the addition to the paste of water insoluble hydrophilic fillers, such as cellulose derivatives or cotton fibers, which will aid in the transportation of the water vapor through the synthetic layer. Besides the above mentioned fillers one can also add blowing agents. These will give the synthetic layer a cellular character increasing the porosity.

Besides the above mentioned known methods which use a paste in which the polymer probably together with one or more pigments and/or fillers are dispersed in the plasticizer, a method for the preparation of synthetic leather is known using a paste in which a vinyl polymer or copolymer, together with a plasticizer and one or more pigments and/or fillers, is dispersed in water.

By utilization of this aqueous dispersion doctored on a carrier, one can obtain a layer of material with weight of approximately 100 grams per square meter which can be gelled immediately after deposition at a temperature of over 160° C. With layers, for example, with a weight of 200 grams per square meter or more however, this is not possible because the water evaporates during the gelation of the resin, and extreme blistering can occur while at the same time very large pores are obtained.

Blister formation can be avoided when the layer is first dried at around 100° C. and gelation is done later at a higher temperature. In this manner, one obtains a homogeneous resin layer which, however, does not contain any pores and, therefore, is not permeable to air and water vapor.

Surprisingly, it has been found that by utilization of the aqueous dispersion a doctored layer of the same type of vinyl polymer and copolymer with the weight of 200 grams per square meter or more can be forced without blisters by fast heating to at least 160°, if one adds to the dispersion 5 to 40% of a 60% solution of a thermosetting resin in an organic solvent. The resinous layer obtained in this manner contains a large number of very fine pores and is, therefore, very permeable to air and water vapor.

Therefore, in this invention following the method as mentioned in the title, one adds to the dispersion 5 to 40% of a 60% solution of a thermosetting resin in an organic solvent. While the ranges given are based on a 60% solution of the thermosetting resin, this being the concentration regularly available in trade, it is to be understood that corresponding amounts of the resin can be added in the form of solution having a concentration as low as 20% or as high as 80%.

The dispersion can be doctored onto a final as well as a temporary carrier. In the latter case the formed resin layer is removed from the carrier giving a film, which can be doubled up with the final carrier later. As carrier material one can use a woven material or a non-woven made on a paper machine.

As a final carrier, can also be used a tricot sheet. If the dispersion is doctored onto a textile woven material, the doctor method and the viscosity of the dispersion have to fit the openness of the weave. For this purpose one can regulate the viscosity of the dispersion through the addition of a thickening agent for the aqueous phase, such as bentonite. The utilization of a thickening agent for the oil phase, for example, for the plasticizer is not recommended because this influences the porosity adversely.

The optimum dosage of the resin solution to be added depends of the percentage of plasticizer based on the polymer, preferably the amount of resin solution added is 10–20%.

The synthetic leather made in accordance with the invention can be used for footwear or wearing apparel as well as for upholstery purposes. The invention will be further elucidated using the following examples.

Example 1

75 parts of a pigment dispersion containing 3 parts of pigment and 72 parts of di-(2-ethyl-hexyl) phthalate are slowly under continuous stirring with a mixer added to 100 parts of a 4% solution of methyl cellulose or carboxymethyl cellulose in water. As soon as the plasticizer and the pigment are well dispersed, 100 parts of polyvinyl chloride of the emulsion type and 3 parts of the stabilizer are added, stirring slower than before, the stabilizer being composed of 2 parts of an epoxy stabilizer having the formula

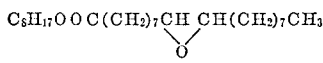

and 1 part of a co-precipitable barium-cadmium soap. To this dispersion are added: 50 parts of a 60% solution of a butylated urea formaldehyde resin in butanolxylene. After the mix has been well homogenized, the dispersion is ready for use. A layer of this dispersion can now be doctored onto a temporary carrier in the thickness of .5 millimeters and can be gelled by immediate heating to 180° C. for 2–3 minutes. Grain can be obtained in the usual way after the surface has been intensively heated by infrared.

After removing of the resin layer from the provisional carrier, a strong flexible resin film is obtained having an air permeability of approximately 15 liters/square decimeters/minutes and a water vapor permeability of approximately 450 grams/square meters/24 hours.

Air permeability is measured under 50 centimeters water pressure and the permeability for water vapor is measured through a difference in relative humidity at 95% of the inside and outside of a cup closed off by the material in question.

Example 2

The urea formaldehyde solution used in Example 1 is replaced by 50 parts of a 60% solution of a butylated melamine formaldehyde resin in butanol xylene yielding the same end results.

Example 3

The di-(2-ethyl-hexyl) phthalate in Example 1 is replaced by 72 parts of butyl benzyl phthalate instead of using 50 parts only 45 parts of a solution of urea formaldehyde resin are added. The results are the same as with Example 1.

Example 4

Example 1 is followed up and including the addition of polyvinyl chloride and stabilizer. Thereafter 65 parts of a 60% solution of a butylated urea formaldehyde resin in butanol xylene is added. Subsequently while stirring 15 parts of calcium magnesium carbonate (Microdol) and 25 parts of bentonite are added, after which the mix is well homogenized on a three roll mill.

The dispersion can be doctored onto a flat woven fabric which is napped on one side in the thickness of a .5 millimeter yielding a weight of 100 grams per square meter, gelled in 2–3 minutes at 180° C. and subsequently grained. The distance between the embossing rolls has to be carefully set. The synthetic leather obtained in this manner has an air permeability of approximately 15 liters/square decimeters/minutes and a water vapor permeability of approximately 300 grams/square meters/24 hours.

Example 5

Usng the method as explained in Example 1 a dispersion is made with the following constituents:

100 parts of a 4% solution of methyl cellulose in water,
87 parts of dispersion containing 64 parts of di-n-heptyl phthalate,
17 parts of di-(2-ethyl-hexyl) phthalate,
3 parts of the stabilizer and 3 parts of pigment,
100 parts of polyvinylchloride emulsion type size 5–20 microns,
40 parts of polyvinylchloride emulsion type of which 70% falls between 50 and 250 microns,
30 parts of a 60% solution of a butylated urea formaldehyde resin in butanol xylene.

A layer of this dispersion is doctored onto a provisional carrier in a thickness of .7 mm. and immediately gelled at 180° C. in 2–3 minutes. The film is then embossed with carefully adjusted embossing rolls. The film is strong and flexible and has an air permeability of approximately 10 l./dm.$^2$/min. and a water vapor permeability of approximately 300 gms./m.$^2$/24 hrs.

Example 6

Example 5 is followed. However, 15 parts of Microdol and 10 parts of bentonite are added to the dispersion.

The dispersion is doctored onto a rayon broken twill weave in a thickness of .7 mm. giving a weight of 225 gm./m.$^2$, gelled at 180° C. in 2–3 minutes, and subsequently embossed with carefully adjusted embossing rolls. The obtained synthetic leather has an air permeability of approximately 5 l. dm.$^2$/min. and a water vapor permeability of approximately 300 gms./m.$^2$/24 hours.

The above mentioned examples can be varied while still remaining within the limits of the invention.

As a solvent for the thermosetting resin, one can also use ispropyl alcohol. Instead of a butylated resin, a propylated resin can be used. The concentration of the resin solution can be lower also. However, this is only an advantage when using an extremely low plasticizer percentage.

The flexibility of the obtained synthetic resin is influenced by the percentage of plasticizer. However, the percentage of plasticizer has also a large influence on the viscosity of the dispersion. In the Examples 5 and 6 flexibility of the synthetic leather can be lowered by using a larger amount of polyvinyl chloride having 70% with the size falling between 50 and 250 microns.

Instead of the mentioned phthalates based on plasticizers other plasticizers can be used, for example, sebacates, azelate, epoxy plasticizers, polymeric plasticizers, as well as mixtures of these materials. Fillers, foaming agents and such can be added to the dispersion also.

Having thus described the invention, what is claimed is:

1. In a method for the production of synthetic leather, wherein an aqueous dispersion of (1) a polymer selected from the group consisting of a vinyl polymer and a vinyl copolymer, and (2) a plasticizer for said polymer is deposited evenly upon a carrier and subsequently gelled by heating, the step of adding to said dispersion prior to deposition on said carrier from 5 to 40% by weight of a solution of a thermosetting resin in an organic solvent, whereby after gelling, a gas permeable synthetic leather is produced.

2. The method of claim 1 wherein said aqueous dispersion also contains at least one member selected from the group consisting of a filler and a pigment.

3. The method of claim 1 wherein said dispersion is gelled immediately after deposition on said carrier by quickly heating it to a temperature above 160° C.

4. The method of claim 1 wherein there is added from 10 to 20% by weight of said solution of said thermosetting resin.

5. The method of claim 1 wherein said thermosetting resin is an alkylated amino resin and said organic solvent is selected from the group consisting of an alcohol and a mixture of an alcohol and an aromatic hydrocarbon.

6. The method of claim 5 wherein said alkylated amino resin is selected from the group consisting of a butylated urea formaldehyde resin, a propylated urea formaldehyde resin, a butylated melamine formaldehyde resin and a propylated melamine formaldehyde resin and said solvent is a mixture of butanol and xylene.

7. The method of claim 1 wherein said carrier is a woven textile material and the viscosity of said dispersion is adjusted to the openness of the weave by adding a thickening agent for the aqueous phase.

8. The method of claim 7 wherein said thickening agent is bentonite.

9. The method of claim 1 wherein said dispersion is first deposited on a temporary carrier and gelled, the gelled layer is stripped from said temporary carrier and is laminated with a permanent carrier comprising a woven textile.

10. The method of claim 1 wherein the surface of the gelled resin layer is grain embossed.

11. A synthetic leather material composed of a gelled composition of (a) a polymer selected from the group consisting of a vinyl polymer and a vinyl copolymer, (b) a plasticizer for said polymer, and (c) from 5 to 40% by weight of the composition weight of a thermosetting resin; said material being air and water vapor permeable but substantially impermeable to water.

12. A synthetic leather material according to claim 11 wherein the thermosetting resin is an alkylated amino resin.

13. A synthetic leather material according to claim 12 wherein said alkylated amino resin is selected from the group consisting of a butylated urea-formaldehyde resin, a propylated urea-formaldehyde resin, a butylated melamine-formaldehyde resin and a propylated melamine-formaldehyde resin.

References Cited

UNITED STATES PATENTS

| | | | |
|---|---|---|---|
| 2,384,880 | 9/1945 | Britton et al. | 260—42 |
| 2,438,097 | 3/1948 | Rogers et al. | 260—86 |
| 2,454,209 | 11/1948 | Rogers et al. | 260—43 |
| 3,041,193 | 6/1962 | Hamway et al. | 117—11 |
| 3,312,586 | 4/1967 | Barlow | 161—109 |

OTHER REFERENCES

C.I.P. appln. #165,317, filed Jan. 10, 1962.

EARL M. BERGERT, *Primary Examiner.*

M. L. KATZ, *Assistant Examiner.*